3,062,767
METHOD OF STRIPPING SOLVENT FROM A POLYMER LATEX
Edward Allen Hunter, Baton Rouge, La., and Augustus B. Small, Westfield, and Alfred L. Miller, Cranford, N.J., assignors to Esso Research and Engineering Company, a corporation of Delaware
No Drawing. Filed May 13, 1958, Ser. No. 734,842
3 Claims. (Cl. 260—29.7)

This invention relates to the stripping of hydrocarbon solvent from raw butyl rubber latex (i.e., latex containing dissolved rubber) to produce a solvent-free finished butyl rubber latex. More particularly, the present invention comprises adding a dilute aqueous emulsifier solution to a stripping means, elevating the temperature within said stripping means to stripping conditions, introducing raw butyl rubber latex or pre-stripped or partially pre-stripped latex into said hot stripping means, continuously volatilizing solvent until the latex in the stripping means is essentially a finished latex, and continuously adding additional raw latex to the stripping means and withdrawing finished latex therefrom.

The butyl ruber to which the above stripping system is applicable is a copolymer of a $C_4$ to $C_8$ isoolefin such as isobutylene with a multiolefin prepared at low temperature by a Friedel-Crafts catalyst. The major component of the copolymer is preferably isobutylene. The minor component is a multiolefin having about from 4 to 12 or 14, preferably 4 to 6, carbon atoms per molceule. The preferred multiolefins are butadiene, isoprene, dimethyl butadiene, dimethallyl, myrcene, allo-ocymene and the like. Of these materials, isoprene is presently regarded as the best multiolefin. The isobutylene and the multiolefin are mixed in the ratio of a major proportion of isobutylene and a minor proportion of the isoprene, the preferred range with isoprene being from 1 to 10 parts of isoprene with 99 to 90 parts of isobutylene.

The mixture of monomers is cooled to a temperature within the range between $-40°$ C. and $-170°$ C. The cold mixture is polymerized by the addition thereto of a Friedel-Crafts catalyst in the liquid or dissolved form. The polymerization proceeds rapidly to yield the desired polymer which precipitates out from the solution in the form of a slurry suspended in a diluent of fine particles of a flocculent white solid having many of the physical characteristics of raw gum rubber. When the polymerization has reached the desired stage, the material is conveniently recovered by discharging the whole mixture into warm water which may contain an alcohol or other material to inactivate the catalyst. The warm water flashes off the excess refrigerant, unpolymerized olefins and catalyst solvent. The polymer is recovered by straining or filtering or by other means and then dried. Before drying, the polymer shows a Staudinger molecular weight from 35,000 to about 2,000,000.

In accordance with the present invention, to prevent coagulation of the rubber, a stripping means such as a stripping tower or column is charged with a 0.1 to 10 weight percent, preferably 0.5 to 5.0 weight percent solution in water of an emulsifier such as alkali metal polyoxyethylene nonyl phenol sulfates, ammonium lauryl sulfate, potassium oleate, diisobutyl phenoxethoxyethyl dimethyl benzyl ammonium chloride or the like, and heated to a temperature sufficient to strip out the solvent from raw butyl rubber latex, i.e., about $100°$ to $200°$ F. There is then added to the stripping means the raw butyl rubber latex (i.e., a solvent containing cement of butyl rubber+water+emulsifier).

Suitable solvents which may be used to dissolve the butyl rubber polymer may be any liquid in which the polymer is soluble, such as for example the hydrocarbon solvents hexane, heptane, octane, isooctane, the nonanes, the decanes, naphtha fractions, benzene, toluene, Varsol, Solvesso 100 (a substantially 100% aromatic hydrocarbon fraction boiling $315$–$350°$ F.) and Solvesso 150 (a substantially 100% aromatic hydrocarbon fraction boiling $365$–$415°$ F.), cyclohexane, cyclohexene, carbon tetrachloride, trichloroethylene, carbon disulfide, methyl ethyl ketone and the like. More volatile solvents can be used but pressure equipment would be required to minimize evaporation losses.

To this solution is preferably added a fatty acid containing 12 to 24 carbon atoms. An aqueous solution of an alkali metal hydroxide is also preferably prepared using an amount of hydroxide in slight excess of that required to neutralize all the fatty acid. A small amount of polyoxyethylated octyl or nonyl phenol containing 7 to 12 ethylene oxide units and a small amount of polyvinyl alcohol are also advantageously added to the hydroxide solution. Before adding to the stripping means, the two solutions are mixed in a suitable homogenizer, such as a colloid mill, a sonic mixer, a Dispersator, a Waring Blendor or the like. A particularly suitable homogenizer is a sonic mixer known as the Rapisonic homogenizer. This consists of a gear pump which forces the material through an orifice and impinges the stream on a knife edge or vibrating blade enclosed in a resonating bell. The hydroxide and fatty acid react to produce a soap in situ which functions as the main emulsifier. The polyvinyl alcohol functions as a protective colloid in the emulsification helping also to stabilize the system during and after the subsequent stripping stages. The polyoxyethylated alkyl phenol acts to suppress foam formation when soaps are used as the emulsifiers and as a stabilizer of the finished latex. It is often desirable to preheat the polymer solution and the water separately to as high a temperature as permissible before mixing to reduce difficulties due to viscosity.

As above-mentioned, the raw butyl rubber latex is then added to the stripping means and heated at $100°$–$200°$ F. for a time sufficient to volatilize essentially all of the solvent and produce a finished latex. Without the presence of this finished latex, it has been found that additionally introduced raw latex becomes unstable and coagulates out an excessive amount of the dispersed polymer.

A particularly suitable emulsifier system within the broad outline above given has been found to be oleic acid, 3 to 4 parts by weight per hundred parts of rubber (phr.), potassium hydroxide, 0.6 to 0.9 phr. (i.e., from a stoichiometrical amount to a slight excess), polyvinyl alcohol, 2.0 to 3.5 phr., and Triton X-100 (a polyoxyethylated octyl phenol containing 8 to 10 ethylene oxide units), 2.0 to 4.0 phr. The above ranges are preferred but in all cases additional amounts can be used as desired except that a too great excess of potassium hydroxide should be avoided since too high a pH is conducive to foaming, even though a foam suppressor, such as Triton X-100 is used. Nevertheless, it is desirable to have a slight excess of potassium hydroxide, sufficient to maintain the pH of the aqueous component between 10 and 11. In this way, it has been found possible to reduce the amount of rubber lost by coagulation during subsequent steps in the process, as for example in the emulsification and stripping steps. If the pH of the aqueous component be adjusted to below 9 prior to mixing, 30 to 50% of the rubber initially used may be lost. Careful control of the pH of the components, however, reduces this loss to a minimum.

Instead of oleic acid, other fatty acids may be used in forming the soap, such as palmitic, linoleic, stearic and other fatty acids containing 12 to 24 carbon atoms. Other alkali metal hydroxides which can be used include sodium hydroxide, lithium hydroxide, caesium hydroxide and rubidium hydroxide. Ammonium hydroxide and its derivatives can also be used. Any of the polyoxyethylated alkyl phenols having from 7 to 12 ethylene oxide units may be used. Triton X–100 and Triton X–45 (having 5 ethylene oxide units) have both been found suitable. In each of these compounds the alkyl group is octyl. However, the use of similar compositions in which the alkyl group is nonyl give equally good results.

In order to more fully illustrate the present invention, the following experimental data are given:

Example

A 4 liter continuous glass laboratory stripper was charged with 400 cc. of water plus 400 cc. of a 1.5 weight percent solution of the emulsifier potassium oleate which is the same emulsifier used for producing butyl rubber latex in this example. This mixture was heated to 195° F. and then a raw latex brought in having the following composition.

| Component: | Parts by weight |
|---|---|
| Butyl rubber [1] | 100 |
| Emulsifier (potassium oleate) | 9.0 |
| Hexane | 300 |
| Water | 300 |

[1] The butyl rubber used was a commercial isobutylene-isoprene copolymer having an 8 minute Mooney viscosity at 212° F. of 75, a mole percent unsaturation of 2.15, and a viscosity average molecular weight of 430,000.

The latex addition was continued for 2 hours at an average rate of 1120 cc. per hour giving a hold-up time in the hexane stripper of 2 hours. This gave essentially complete hexane removal plus 1.0 part of water removed per 10 parts of hexane. Foaming was easily controlled.

A raw butyl rubber latex of the same formulation as above was then pumped continuously into the stripper which was held at 190° F. and atmospheric pressure. The latex, freed of hexane was removed continuously at such a rate to give a residence time of 3 hours. After 12 hours, the following determinations were made.

| Sample | Raw latex | Finished latex |
|---|---|---|
| Weight percent solids | 16 | 30 |

Total over-all coagulation was 3.5 weight percent of the polymer feed which is considered in the art to be very good. The resulting latex was also completely stable and gave an adhesion of 19.3 lbs./end to rayon tire cords embedded in a butyl rubber matrix.

The above data show that by starting up the stripper first with a dilute emulsifier solution and by maintaining at least a partially finished latex in the stripping vessel during stripping of raw latex, coagulation of the butyl rubber polymer particles dispersed is held to an exceptionally low level of 3.5%.

Resort may be had to modifications and variations of the disclosed embodiments without departing from the spirit of the invention or the scope of the appended claims.

What is claimed is:

1. In a process of stripping solvent from a raw latex of a copolymer of a $C_4$ to $C_8$ isoolefin with a conjugated diolefin, said latex containing said copolymer dissolved in a solvent and emulsified with water and an emulsifier, the combination which comprises charging a stripping means with a dilute aqueous emulsifier solution, heating the emulsifier solution to a temperature between 100° and 200° F., subsequently continuously introducing raw butyl rubber latex into said hot stripping means and removing the solvent.

2. The method of claim 1 in which the solvent in the raw polymer latex is continuously volatilized until the latex in the stripping means is essentially a finished latex, and continuously adding additional raw latex to the stripping means containing finished latex and withdrawing finished latex therefrom.

3. The method of claim 2 in which the stripping temperature is between about 100° and 200° F.

References Cited in the file of this patent

UNITED STATES PATENTS

| 2,296,437 | Daniel et al. | Sept. 22, 1942 |
| 2,313,144 | Gomm | Mar. 9, 1943 |
| 2,595,797 | Leyonmark | May 6, 1952 |
| 2,611,751 | Scott | Sept. 23, 1952 |